United States Patent Office
3,261,708
Patented July 19, 1966

3,261,708

PROCESS FOR FORMING CHEMICALLY DEPOSITED PHOTOSENSITIVE LEAD SULFIDE LAYERS

Raymond Cooperstein, Cincinnati, Ohio, assignor to Eastman Kodak Company, Rochester, N.Y., a corporation of New Jersey No Drawing. Filed July 30, 1958, Ser. No. 753,173
8 Claims. (Cl. 117—34)

This invention relates to infrared sensitive lead sulfide photoconductive cells. In a specific aspect this invention relates to an improved process for producing photosensitive lead sulfide cells.

The photosensitivity of lead sulfide has been known for many years and crystalline surfaces of lead sulfide have been prepared by methods that can be divided into two groups generally referred to as chemical deposition and vacuum evaporation. Lead sulfide cells prepared by both procedures have been used in the past.

In preparing photosensitive lead sulfide cells by a chemical deposition procedure various factors are important in obtaining cells of satisfactory photosensitivity. Among the important factors are the concentrations of the components in the reaction mixture, the temperature at which the reaction and deposition are conducted, the reaction and deposition time, etc. In a chemical deposition procedure the lead sulfide layer is deposited on a glass or similar substrate by the decomposition of the compound salt of lead nitrate and thiourea through the action of an alkali metal hydroxide. Results of many chemicla depositions have shown that the reaction rate is a determining factor in the formation of good photosensitive lead sulfide layers. Layer formation of the lead sulfide occurs only when controlled reaction rates (lead sulfide precipitations) are employed in the chemical depositions.

It is an object of this invention to provide an improved method for preparing lead sulfide photosensitive cells by a chemical deposition procedure wherein the reaction rate is satisfactorily controlled. It is another object of this invention to provide a method for producing photosensitive lead sulfide cells by a chemical deposition procedure wherein the cells obtained have improved time constants. Further and additional objects of this invention will be apparent from the detailed description hereinafter.

In accordance with this invention it has been found that in the production of photosensitive lead sulfide cells by a chemical deposition procedure the reaction rate and deposition of the lead sulfide on the substrate can be satisfactorily controlled by employing in the reaction mixture during the deposition an alkali metal halide, the halogen being selected from the group consisting of bromine and iodine. In conducting the deposition of the lead sulfide the amount of halide that is used is important. In order to obtain satisfactory control of the reaction with sodium bromide at least 0.05 gram of sodium bromide per liter of reaction mixture are used. However, if the amount of sodium bromide employed exceeds 0.3 gram per liter the resulting deposition mixture produces lead sulfide layers exhibiting subnormal sensitivity characteristics. When sodium iodide is employed to control the reaction rate from 0.005 to 0.05 gram per liter of sodium iodide in the reaction mixture have been found to produce the desired results.

The primary feature of the present invention which provides an improvement in the process of producing lead sulfide cells is the presence of an alkali metal halide in the coating solution. The proportion of halide in the coating solution is quite important. If the concentration of metal halide is below a certain value, the precipitation and crysallization of the lead sulfide proceeds slowly and the change of color effectively stops; the resultant lead sulfide cells are then of considerably decreased sensitivity. Similarly, if the concentration of halide is too high, it is quite impossible to control the rate of precipitation and crystallization of the lead sulfide or to get as useful a product.

According to the present invention, the rate of precipitation of the lead sulfide and hence the crystalline form of the lead sulfide coating is controlled by having an alkali metal halide, e.g., sodium bromide and sodium iodide, in the precipitating solution. Sodium fluoride and sodium chloride do not cause any decrease in the reaction rate when added to the deposition mixture. The precipitated layer of lead sulfide prepared according to this invention comprises lead sulfide precipitated from a highly alkaline solution of sodium halide and a lead salt by the addition of a solution of thiourea. In some embodiments the sensitivity of the cells is improved if the addition of thiourea is in the presence of an alkali metal sulfite. The halide may be in either the lead salt solution or the thiourea solution, or both, before the solutions are combined provided the amount of halide used is within the range just specified.

When lead sulfide is precipitated in the above-described manner, it tends to be heavier than the solution and, hence, it tends to sink to the bottom of the container. The crystallized lead sulfide surfaces are more sensitive if they are allowed to form on the underside of flat substrates placed in the solution. If a flat glass plate, seeded on both sides, is placed in the precipitating solution with one side facing up and the other side facing down, both faces or surfaces of the glass plate receive a coating of the precipitating lead sulfide. However, the lower surface is considerably more sensitive than the upper surface. Actually, the glass plate does not have to be placed horizontally in the precipitating solution since vertical surfaces receive a fairly sensitive coat of lead sulfide but preferably the glass plate is tilted toward a horizontal position so that the sensitivity of the underside or lower surface is increased. Also, to prevent any unnecessary interference with the crystallization of the lead sulfide, agitation of the solution during coating is kept at a minimum.

In a preferred form of the present invention, a highly alkaline solution of lead nitrate or plumbite solution is made up of 170 cc. of distilled water, 100 cc. of a lead nitrate solution containing 100 grams of lead nitrate per liter of water and 90 cc. of sodium hydroxide solution containing 140 grams of sodium hydroxide per liter of water. To this alkaline solution of lead nitrate is added 70 cc. of ethanol immediately prior to addition of the thiourea solution and the resulting solution is brought to a temperature of 23° C. Due to the amphoteric nature of lead this gives a solution of plumbite ion. An aqueous thiourea solution containing 10 grams of thiourea (preferably recrystallized), 0.05 gram of sodium bromide and 1 gram of anhydrous sodium sulfite in 100 ml. of water is also brought to 23° C. The thiourea solution is added to the alkaline lead nitrate solution. The resulting mixture turns amber and, as time progresses, this color becomes darker. In about 8 minutes it becomes a deep gold color. The gold then turns to brown, and finally to black. Just before the solution is entirely black, i.e., when the optical density per centimeter thickness reaches about .5, which occurs some 30 seconds after a uniform brown and around 10 to 15 minutes after the start of the process at 23° C., the seeded glassblanks are immersed and the lead sulfide precipitated on the seeded surface and on the walls of the container. Optical density per centimeter thickness does not include the coating on the walls. Density readings, when taken, are made promptly through clean densitometer windows or cells. However, in practice precise numerical values are not needed. The numerical values are mentioned here only because terminology is simplified thereby. In practice it is quite easy visually to select a time somewhere in the range starting at some moment when the solution becomes quite dark and continuing to some moment several minutes after the solution first becomes quite black. A time anywhere in this broad range gives the optimum effect. An optical density of about .5 per centimeter corresponds to start of this range.

The blanks should remain in the solution for a period of time between 10 and 100 minutes, preferably about 25 to 35 minutes. The cells are then rinsed with cool tap water. The surface of the glass plate which has faced upward or partially upward in the precipitating solution will be noted to have a dark sooty deposit thereon and this surface will be found to be relatively insensitive, whereas the other surface which has faced at least partially downward will have a uniform gray appearance. Any loose crystals adhering to the sensitive surface are usually removed by careful swabbing with a camel's hair brush. The surface may be dried either with a blotter or by being allowed to stand in air. The sensitive surface is then ready to receive electrical contacts and to be used as a photoconductive cell. It does not have to be placed in a vacuum.

The rate of reaction in each of the steps described above depends on temperature. The temperature should be between 5° C. and 40° C. and shorter times are used at the higher temperatures, whereas longer times are used at lower temperatures. The process works quite well at room temperature and, hence, it is for this reason 23° C. was selected in the example given above.

The alkali metal halide can be in either the thiourea or in the plumbite solution before the two solutions are combined provided the molar concentration in the ultimate precipitating bath is in the range specified. It is sometimes convenient to have the halide and lead salt in a single stock solution. The halide can be in the form of an aqueous solution or it can be used in a solid form.

The lead concentration with reference to the complete precipitating bath is between .05 and .06 molar, and the actual concentration used depends somewhat on the sodium hydroxide concentration. The sodium hydroxide should be between .55 and .75 molar, the higher concentrations being used with the higher concentrations of lead. The lead is introduced in the form of a water soluble salt, preferably lead nitrate, lead acetate, lead chlorate or lead perchlorate.

The preferred time to add the seeded glass blank to the precipitating solution is within a few minutes either way of when the color of the solution reaches a dark brown, or almost black, color.

Useful cells are obtained when the cell is added any time within a range between 5 minutes early and 15 minutes late with respect to the "just black" moment, specifically at 23° C. In other terms, if the temperature is between 5° C. and 40° C., preferably between 20° C. and 30° C., one should wait for a period between 5 and 30 minutes from the time the thiourea is added to the lead alkali solution and should then immerse the seeded surface in the precipitating solution for a period of time between 10 and 100 minutes.

The thiourea concentration in the precipitating bath is preferably between 0.15 and 0.3 molar. Additional sensitivity can be obtained by the addition of an alkali sulfite such as the sodium sulfite to the precipitating bath preferably in the thiourea solution. The sulfite concentration should be between 0 and .05 molar. It will be realized that since the reaction time depends on temperature, factors given above will also vary with temperature at least within the ranges specified. In fact, a change of 4 or 5° C. apparently will change the reaction rate by a factor of 2.

The present invention can be used with any type of preseeding of the substrate to be coated such as the mechanical or chemical deposition or thermal evaporation of a seeded coat of a metal sulfide or a metal oxide. Alternatively, when a glass base is used, dipping of the glass base in a cationic wetting agent will produce a seed coat. In general, these types of preseeding do not necessarily affect the value of the final sensitivity of the cell appreciably, but they do insure that the coatings will be uniform. They provide the centers for crystallization and the sensitivity, in general, is the same whichever form of seeding is used. However, the preferred embodiment of the present invention employs preseeding in colloidal lead sulfide which actually increases the final sensitivity of the lead sulfide cell, providing the other types of seeding, i.e., other centers for crystallization, are kept to a minimum. It is believed that the crystals which form on this preferred type of seed are of a somewhat different form which in some way accounts for the increased sensitivity.

The solution used for seeding the glass surface or other substrate prior to immersion in the precipitating bath is preferably an aqueous polyvinyl alcohol solution containing 15 cc. of 0.5 percent polyvinyl alcohol, 235 cc. of distilled water, 0.35 cc. of an aqueous lead nitrate solution containing 100 grams of lead nitrate per liter of water and hydrogen sulfide sufficient to produce a final sulfide ion concentration of about 0.002 normal. The seeding solution is allowed to stand for a period of about 0.5 to 1 hour before the glass blanks are inserted for a period of 0.5 to 0.75 hour.

After the seeded glass blanks have been in the precipitating solution for the desired period of time the reaction is halted by flushing with water. The coated cells are then freed of any sooty lead sulfide deposits by gently stroking the coatings with a wetted camel's hair brush. After drying the cells can be prepared for testing.

It has been found that lead sulfide cells prepared in accordance with this invention possess improved properties, particularly the time constants, and by using this invention it is possible to control readily the deposition of the lead sulfide and the thickness of the deposited layer. The control over the rate of deposition of the lead sulfide also makes it possible to obtain layers of lead sulfide of improved uniformity. The deposited lead sulfide appears to have a preferred uniform crystalline form because of the halide, and the halide provides both the rapidity of precipitation and the control of the rapidity or rate so as to enhance the effect of delayed immersion as discussed above.

The invention has been described in detail with particular reference to preferred embodiments thereof, but it will be understood that variations and modifications can be effected within the spirit and scope of the invention as described hereinabove and as defined in the appended claims.

I claim:

1. The method of forming a photosensitive layer of lead sulfide crystals which comprises precipitating the crystals onto a solid glass support by adding a solution of thiourea to an alkali metal hydroxide solution of a lead salt, one of the solutions containing an alkali metal halide, the halogen atom being selected from the group consisting of bromine and iodine, the lead salt being a water soluble salt selected from the group consisting of lead nitrate, lead acetate, lead chlorate and lead perchlorate, the concentrations in the solutions when first combined being as follows: alkali metal halide from 0.05 to 0.3 gram per liter when a bromide is used and 0.005 to 0.05 gram per liter when an iodide is used, lead between .05 and .06 molar, and hydroxide between .55 and .75 molar, and from 5–30 minutes after said solutions are combined immersing the solid glass support in the combined solutions to receive precipitated crystals of lead sulfide and then drying the surface.

2. The method according to claim 1 in which the immersing is for a period of time between 10 and 100 minutes at a temperature between 5° C. and 40° C.

3. The method according to claim 1 in which an alkali sulfite is added to one of the solutions before they are combined with the concentrations of sulfite in the combined solutions less than .05 molar.

4. The method according to claim 1 in which the concentrations of thiourea in the combined solutions is between .15 and .3 molar.

5. The method according to claim 1 in which the immersing is delayed at least until the combined solutions have turned almost black with an optical density greater than .5 per centimeter thickness.

6. The method of forming a photosensitive layer of lead sulfide crystals which comprises precipitating the crystals onto a glass support, preseeded with lead sulfide, by adding a solution of thiourea to an alkali metal hydroxide solution of a lead salt and sodium bromide, the lead salt being a water soluble salt selected from the group consisting of lead nitrate, lead acetate, lead chlorate and lead perchlorate, the concentrations in the solutions when first combined being as follows: lead between .05 and .06 molar, sodium bromide between 0.05 and 0.3 gram per liter, and hydroxide between .55 and .75 molar, and from 5–30 minutes after said solutions are combined immersing the seeded glass support in the combined solutions to receive precipitated crystals of lead sulfide and then drying the surface.

7. The method according to claim 6 in which the seeded glass support is made by seeding it slowly in a stabilized colloidal solution of lead sulfide.

8. The method of forming a photosensitive layer of lead sulfide crystals which comprises seeding a clean glass surface slowly in a stabilized colloidal solution of lead sulfide, adding a solution of thiourea to an aqueous sodium hydroxide solution of lead nitrate and sodium iodide with a concentration of lead between .05 and .06 molar, a concentration of sodium iodide between 0.005 and 0.05 gram per liter and a concentration of sodium hydroxide between .55 and .75 molar and from 5–30 minutes after said solutions are combined immersing the seeded glass surface in the combined solutions to receive precipitated crystals of lead sulfide and then drying the surface.

References Cited by the Examiner

UNITED STATES PATENTS

| | | | |
|---|---|---|---|
| 2,659,682 | 11/1953 | Anderson | 117—34 X |
| 3,017,296 | 1/1962 | Dunn et al. | 117—34 |
| 3,030,236 | 4/1962 | Cooperstein | 117—34 |

WILLIAM D. MARTIN, *Primary Examiner.*

LEON D. ROSDOL, *Examiner.*

S. F. STONE, S. W. ROTHSTEIN, *Assistant Examiners.*